US011532271B1

(12) United States Patent
Hu et al.

(10) Patent No.: US 11,532,271 B1
(45) Date of Patent: Dec. 20, 2022

(54) METHOD AND SYSTEM OF PROFILING DISPLAY POWER

(71) Applicant: Purdue Research Foundation, West Lafayette, IN (US)

(72) Inventors: Yu Charlie Hu, West Lafayette, IN (US); Pranab Dash, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/827,671

(22) Filed: May 28, 2022

Related U.S. Application Data

(60) Provisional application No. 63/212,717, filed on Jun. 20, 2021.

(51) Int. Cl.
G09G 3/3225 (2016.01)

(52) U.S. Cl.
CPC ... *G09G 3/3225* (2013.01); *G09G 2300/0809* (2013.01); *G09G 2330/021* (2013.01)

(58) Field of Classification Search
CPC ............ G09G 3/3225; G09G 2330/021
See application file for complete search history.

(56) References Cited

U.S. PATENT DOCUMENTS

| | | | |
|---|---|---|---|
| 2011/0185205 A1* | 7/2011 | You ..................... | G06F 1/3265 713/320 |
| 2015/0109319 A1* | 4/2015 | Yata ..................... | G09G 3/2003 345/590 |
| 2017/0359487 A1* | 12/2017 | Andersen ............. | H04N 1/6005 |

OTHER PUBLICATIONS

Tan et al., Focus: A usable &effective approach to oled display power management. In Proceedingsof the 2013 ACM International Joint Conference on Pervasive and UbiquitousComputing, UbiComp '13, pp. 573-582, New York, NY, USA, 2013. ACM.
Wan et al., Detectingdisplay energy hotspots in android apps. Journal of Software: Testing,Verification, and Reliability, 27(6):1-15, 2017.
Welch, Google confirms dark mode is a huge help for battery life onandroid, Online, Nov. 8, 2018.
Wilde, Chrome Canary 77 tweaks dark mode on web pages, nolonger inverts image colors, Jul. 16, 2019.
Colormatrix, Online, date unknown.
G suite updates, Online, Dec. 6, 2019.
New features available with ios 13,Online, Aug. 7, 2019.
Dong et al.. Power modeling of graphicaluser interfaces on oled displays. In Proceedings of the 46th AnnualDesign Automation Conference, pp. 652-657. ACM, 2009.

(Continued)

*Primary Examiner* — Sepehr Azari
(74) *Attorney, Agent, or Firm* — Piroozi-IP, LLC

(57) ABSTRACT

A method of determining a model for pixel power consumption for each pixel in a display of a device displaying each color in a color space is disclosed which includes establishing a color space for the display, decomposing the color space into a plurality of subgrids, measuring the pixel power associated with a selected set of colors in each subgrid of the plurality of subgrids, establishing a pixel power model for each subgrid of the plurality of subgrids by applying a function to the power values at the selected set of colors in that subgrid, and deriving a piecewise pixel power model for the entire color space which includes pixel power models for the plurality of subgrids.

16 Claims, 6 Drawing Sheets

(56) References Cited

OTHER PUBLICATIONS

Dong et al., Power-saving color transformationof mobile graphical user interfaces on oled-based displays. InProceedings of the 2009 ACM/IEEE International Symposium on LowPower Electronics and Design, ISLPED '09, pp. 339-342, New York,NY, USA, 2009. ACM.
Dong et al., Chameleon: A color-adaptive web browser formobile oled displays. In Proceedings of the 9th International Conferenceon Mobile Systems, Applications, and Services, MobiSys '11, pp. 375-376, New York, NY, USA, 2011. ACM.
Forrest, The road to high efficiency organic light emitting devices. Organic Electronics, 4:45-489, 2003.
Jain, Introducing dark mode on microsoft intune companyportal for ios, Online, Dec. 6, 2019.
Kim, et al., Runtime power estimation of mobileamoled displays. In 2013 Design, Automation & Test in Europe Conference& Exhibition, pp. 61-64. IEEE, 2013.
Li, The ultimate guide to dark mode for email marketers, Online, Dec. 6, 2019.
Li et al., Making web applicationsmore energy efficient for oled smartphones. In Proceedings of the 36thInternational Conference on Software Engineering, ICSE 2014, pp. 527-538. New York, NY, USA, 2014. ACM.
Li et al., Nyx: A display energy optimizerfor mobile web apps. In Proceedings of the 2015 10th Joint Meeting onFoundations of Software Engineering, ESEC/FSE 2015, pp. 958-961, New York, NY, USA, 2015. ACM.
Mittal et al., Empowering developers toestimate app energy consumption. In Proceedings of the 18th annualinternational conference on Mobile computing and networking, pp. 317-328 ACM, 2012.
Park et al., Accurate power model for mobile amoleddisplays. Electronics Letters, 51(7):553-555, 2015.
PFOP in Google Play, Online, Dec. 4, 2020.
Potuck, How to use dark mode on iphone in ios13, Online, Aug. 7, 2019.
Monsoon power monitor, Online, date unknow.
Schoon, Here's every Google app with a dark mode, and how to enable it, Online, Updated May 19, 2020.
Stanley-Marbell et al., Crayon: Saving powerthrough shape and color approximation on next-generation displays. In Proceedings of the Eleventh European Conference on Computer Systems,EuroSys '16, pp. 11:1-11:17, New York, NY, USA, 2016. ACM.
Anand et al., Adaptive display power management formobile games. In Proceedings of the 9th International Conference onMobile Systems, Applications, and Services, MobiSys '11, pp. 57-70,New York, NY, USA, 2011. ACM.
Measuring power values, Online, Dec. 6, 2019.
Appium: Mobile app automation made awesome, Online, Aug. 1, 2019.
Graphics, Online, date unknown.
SurfaceFlinger and and WindowManager, Online, date unknown.
The mobile economy 2019, Online, Aug. 7, 2019.
Bedford, Apple announces dark mode for your iphone—a newfeature of ios 13, Online, Jun. 3, 2019.
Bell, Programmer's guide to gamma correction, Online, Dec. 6, 2019.
Bradshaw, Android q beta 5: 'force dark' mode settingworks, no longer darkens some google apps, Online, Aug. 7, 2019.
Burke, Final beta update, official android q coming soon!, Online, Aug. 7, 2019.
Burrage, Outlook mobile is rolling out dark mode and exemplifies microsoft365 design, Online, Dec. 6, 2019.
Chang et al., Ssim-based quality-on-demand energysavingschemes for OLED displays. IEEE Trans. Systems, Man, andCybernetics: Systems, 46(5):623-635, 2016.
Chen, et al., How is energy consumedin smartphone display applications? In Proceedings of the 14thWorkshop on Mobile Computing Systems and Applications, HotMobile'13, pp. 3:1-3:6, New York, NY, USA, 2013 ACM.
Chen et al., Mobile oledfriendlyrecording and playback system for low power video streaming.In Proceedings of the 53rd Annual Design Automation Conference, DAC'16, pp. 153:1-153:6, New York, NY, USA, 2016. ACM.
Chen et al., Fingershadow:An oled power optimization based on smartphone touch interactions.In Proceedings of the 5th USENIX Conference on Power-Aware Computingand Systems, HotPower'14, pp. 6-6, Berkeley, CA, USA, 2014.USENIX Association.
Cipriani, Once you use dark mode in these 13 iPhone apps, you'll never go back, Online, Updated Mar. 4, 2020.
Cipriani, After you use dark modein these 14 Android apps,you won't ever go back, Online, Updated Nov. 17, 2020.
Cohen, How to enable dark mode on your web browser, Online, Aug. 7, 2019.
Change text & display settings, Online, data unknown.

\* cited by examiner

METHOD AND SYSTEM OF PROFILING DISPLAY POWER

CROSS-REFERENCE TO RELATED APPLICATIONS

The present non-provisional patent application is related to and claims the priority benefit of U.S. Provisional Patent Application Ser. No. 63/212,717, entitled A METHOD OF PROFILING DISPLAY POWER which was filed Jun. 20, 2021, the contents of which are hereby incorporated by reference in its entirety into the present disclosure.

STATEMENT REGARDING GOVERNMENT FUNDING

None.

TECHNICAL FIELD

The present disclosure generally relates to power profiling of electronics, and in particular, to a method for profiling the power usage of displays.

BACKGROUND

This section introduces aspects that may help facilitate a better understanding of the disclosure. Accordingly, these statements are to be read in this light and are not to be understood as admissions about what is or is not prior art.

Optimizing the battery drain of mobile apps helps to extend the mobile device battery life which is critical to the mobile experience of the 5+ billion phone users (over half are smartphones). Optimizing the battery drain of mobile apps requires optimizing the battery drain of all major power-consuming components, including CPU, GPU, display, WiFi/LTE, GPS, and hardware decoder. After over a decade of phone evolution, display has remained as one of the major power-draining components in modern smartphones.

The latest display technology, Organic light-emitting diode (OLED), uses light-emitting diode as pixels and therefore omits the need for external backlight used in its predecessor liquid crystal display (LCD), and in doing so provides much better power efficiency than LCD. Due to its power efficiency and several other advantages (thinner, lighter, and more flexible) over LCD and standard LED, OLED has seen wide adoption in high-end and mid-range smartphones.

OLED power draw is directly related to the displayed content. Thus any real potential of OLED power savings lies in exploiting the app UserInterface (UI) color design, i.e., how to design the app UI to use pixel colors that result in less OLED display power draw. These include manual designs by app developers as well as automatic color transformations.

One of the extreme examples of color transformation to save display energy of mobile devices is the recent wide adoption of dark-themed color contents, known as dark mode, by both Android and iOS which added dark mode as one of major features in their recent OS update, and app vendors who quickly rolled out dark mode UI options in their latest app releases.

Despite the industry's major push for dark mode, it remains unclear how much power and energy savings dark mode will bring to the apps, as the OLED display power saving from switching from the normal (or light) to dark mode depends on the displayed content, which can vary significantly from one app to another, and from one app activity to the next. More generally, the industry is lacking an OLED display power profiling tool that can accurately estimate the OLED display power draw and attribute it to the individual UI components. Such a tool will enable an app developer to gain instant insight into how different UI designs affect the OLED display power draw in running the app on specific mobile devices and optimize the app UI design accordingly.

Therefore, there is an unmet need for a novel approach to accurately profile the power usage of displays, in particular of OLED displays.

SUMMARY

A method of determining a model for pixel power consumption for each pixel in a display of a device displaying each color in a color space is disclosed. The method includes establishing a color space for the display, decomposing the color space into a plurality of subgrids, measuring the pixel power associated with a selected set of colors in each subgrid of the plurality of subgrids, establishing a pixel power model for each subgrid of the plurality of subgrids by applying a function to the power values at the selected set of colors in that subgrid, and deriving a piecewise pixel power model for the entire color space which includes pixel power models for the plurality of subgrids.

A method of determining power consumption by a display of a device is also disclosed. The method includes receiving a piecewise pixel power model for a color space for the display, wherein the piecewise pixel power model is based on the pixel power models for a plurality of subgrids constituting the color space supported by the display, recording a frame comprising a plurality of pixels, determining to which subgrid of the plurality of subgrids each pixel of the plurality of pixels belong, applying the piecewise pixel power model to each pixel to estimate the power draw associated with the associated pixel, summing up all the estimated powers for the plurality of pixels, and adding a constant baseline power draw value associated with running the display to the estimated power for all the pixels to thereby generate an overall power draw associated with the display, wherein the constant baseline power is a difference between total power draw of the device displaying a static image where all pixels are set to zero, and total power of the device when the display is deactivated.

DETAILED DESCRIPTION

Figure 1:
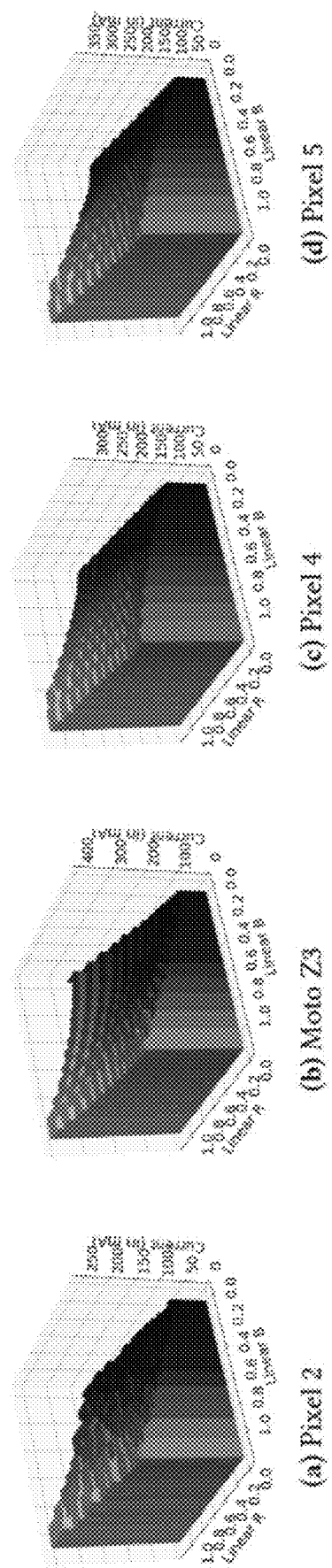
FIG. 1 provides graph 3-dimensional graphs of current draw for different models (a: PIXEL 2, b: MOTO Z3, c: PIXEL 4, and d: PIXEL 5) varying red and blue in the color space while maintaining green constant at 112.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is presented herein to accurately model the power usage of displays, in particular of OLED displays, in displaying any content Towards this end, an accurate per-frame OLED display power profiler, PFOP, is presented that helps developers to gain insight into the impact of different app UI designs on its OLED power draw.

Power modeling of OLED display has been studied over the past decade, first on external display then earlier smartphones. It is thus useful to determine whether the prior-art power models of OLED display proposed in the past decade can accurately capture the power behavior of OLED displays on modern smartphones. To answer this question, a measurement study was carried out to characterize the power behavior of OLED displays on four representative smartphones from four recent generations, PIXEL 2 (2017), MOTO Z3 (2018), PIXEL 4 (2019) AND PIXEL 5 (2020). The study revealed unique power draw behavior of modern phone OLED displays: (1) The OLED display power draw violates the superposition property previously reported based on pixel power simple summation displaying the three base colors: red, green and blue after removing base power—e.g., the power draw in displaying the white color can be far less than the simple summation; and (2) The OLED display power often violates the monotonicity principle, that the power draw in displaying canonically larger RGB values in the color space should be higher. The two findings suggest that previously proposed linear and non-linear OLED power models are unlikely to achieve high prediction accuracy, as confirmed by the study.

Since an OLED display includes N pixels that emit lights independently of each other, the total power draw of an OLED display equals the sum of the power draw $P_i$ by individual pixels:

$$P_{OLED} = C + \sum_{i=1}^{N} P_i \quad (1)$$

where C is a baseline power usage which is a constant and accounts for the power draw by the nonpixel component of the OLED display, also denoted as dark screen power, and $P_i$ represents individual pixel power draw which depends on the pixel color value.

To facilitate measurements of OLED display power for different colored pixels, a simple Android app was created that displays a static image at a time on the screen, while the phone power draw is being measured. The images used will have the same dimension as the screen, e.g., 1920×1080 pixels on GOOGLE Pixel 2. In one implementation, for each of the static colored images, we generated 5 measurements, out of which we chose 3 that had the least standard deviation and took the average. First, we measured the CPU idle power as the power draw when the screen is off and the app is running using a wakelock (a mechanism that ensures the device remains on). Second, we measure the OLED dark screen power by displaying a dark screen with all the pixel values set to zero and then subtract the CPU idle power (from Step 1) from the measured phone power in order to determine the constant C of equation (1). Finally, to measure the power draw by all the colored pixels, i.e., in $$\sum_{i=1}^{N} P_i$$

in displaying a static image, we measure the phone power and subtract from it both the dark screen power and the CPU idle power. The above process is accurate as in all three steps, the CPU utilization remains steady at 2.5%, 4.9%, 1.7% and 2.6% on PIXEL 2, MOTO Z3, PIXEL 4, AND PIXEL 5, respectively.

To understand the power usage, the first question to be answered is whether the power draw of the three subpixels are independent, i.e., whether they satisfy the superposition property which states that the power consumed by three subpixels are additive, as discussed below with regards to Equation (2).

Directly measuring the power draw of every pixel color is too costly (e.g., it would take $256^3 \times 2$ seconds or 1.06 years following our methodology of displaying each image for 2 seconds for a brute force approach of sweeping the 3-D RGB color space, with each base color intensity varied from 0 to 255 (in the sRGB space)), power profiling must be carried out based on a modeling. Different approaches have been proposed in the prior art. According to one approach, pixel power draw is modeled as the simple summation of the power draw of each of the subpixels:

$$P_i(R_i, G_i, B_i) = f(R_i) + g(G_i) + h(B_i) \quad (2)$$

However, because of interdependencies of driving circuits, this simple summation of subpixels proves to be inaccurate for OLED displays. In order to remedy this inaccuracy, others have applied a weighing approach to (2) utilizing, e.g., a linear regression, in order to minimize the error. However, this method still suffers from interdependencies. To account for interdependencies, others in the prior art added non-linear terms to the model before applying linear regression techniques. However, all these suffer from a fundamentally flawed assumption of applying a linear solution to a non-linear problem. Referring to FIG. 1, the current draw for different models (a: PIXEL 2, b: MOTO Z3, c: PIXEL 4, and d: PIXEL 5) is shown with varying red and blue in the color space while maintaining green constant at 112. In each case, it can be seen that the surface defined in the associated 3D graph, i.e. the power draw in varying the red and blue intensities, is not linear across the range of red and blue intensity values, while the approach in the prior art assumes such linearity.

To account for this non-linearity the inventors of the present disclosure have developed a novel approach to divide the aforementioned surface into subdivisions that are either (1) equally sized, or (2) adaptively sized based on the linearity criterion. By treating each appropriately sized subdivision, a linear solution, e.g., a linear regression, can be applied in order to accurately model power usage.

Figure 2:
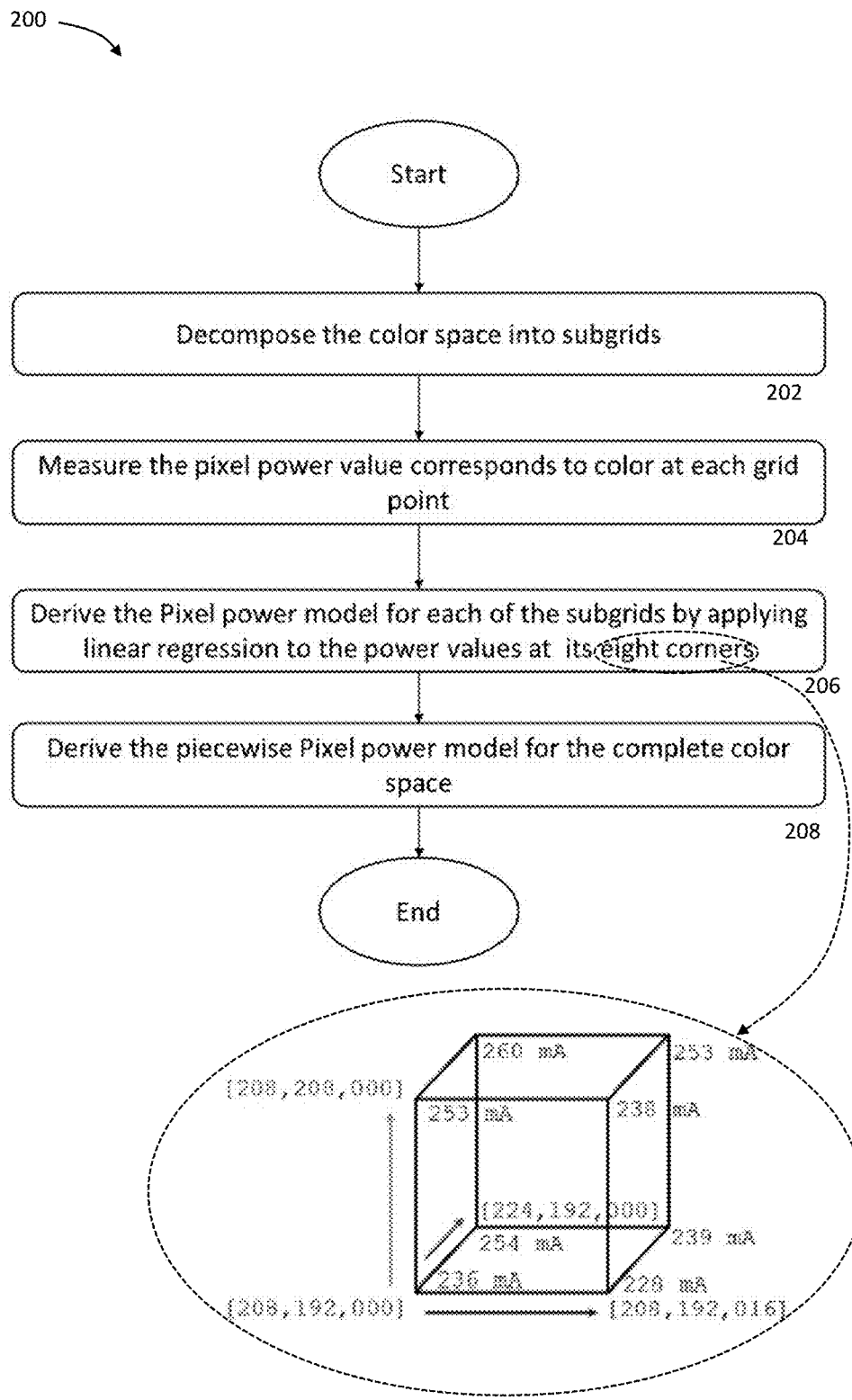
FIG. 2 is a flowchart that describes the operations of the modeling approach of the present disclosure.

Referring to FIG. 2, a flowchart is presented that describes the operations of the modeling approach of the present disclosure. The method 200 shown in FIG. 2, begins by decomposing the color space into subgrids, as shown in step 202. As discussed above, these subdivisions can be equal in size or adaptively chosen as described further below. Next, the method measures each pixel power value corresponds to the color at each grid point, as provided in step 204. This process is described further in reference with FIG. 3, below. Next the method includes deriving the Pixel power model for each of the subgrids by applying linear regression to the linear terms or both linear and non-linear terms of power values at its eight corners (an example of which is shown in FIG. 2), as provided in step 206. Next, the Pixel power model for all the subgrids constitute the piecewise Pixel power model for the complete color space, as provided in steps 208.

Figure 3:
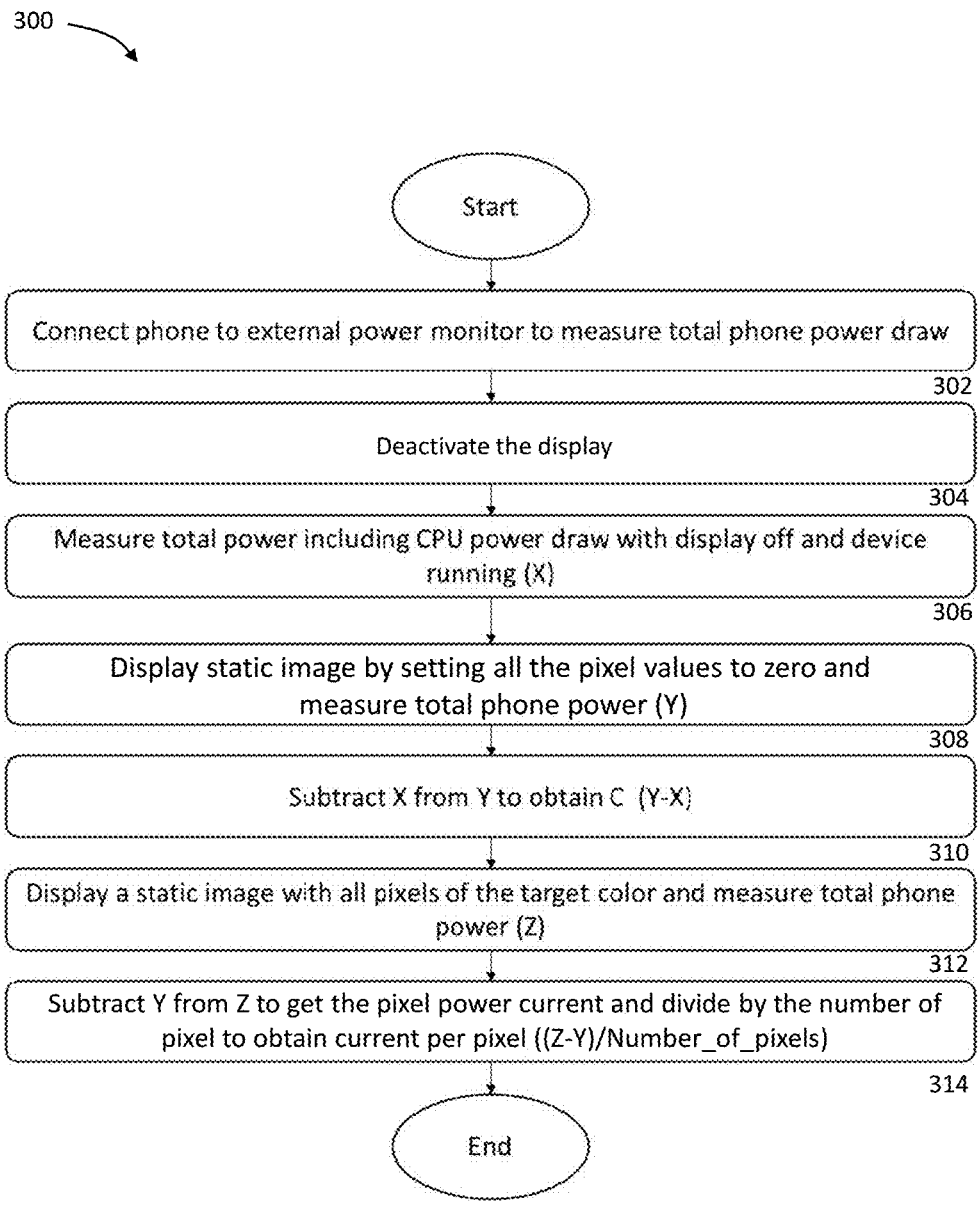
FIG. 3 is a flowchart depicting method steps for measuring per-pixel power for each subgrid point, according to the present disclosure.

Referring to FIG. 3, a method 300 with steps for measuring per-pixel power for each subgrid point is presented. The method 300 of FIG. 3 begins by connecting a device for which display power profiling is desired to an external power monitoring device (see FIG. 6) in order to measure the total device power draw, as provided in step 302. Next the method includes deactivating the display, as provided in step 304. Next, the method includes determining the total device power draw with display turned off but the device otherwise running, as provided in step 306. This power draw is denoted as X. Next, the display is turned on with a static dark image (all pixel values are set to zero) and the total device power is measured, as provided in step 308. This power is denoted as Y. Next the method subtracts X from Y to determine the constant power draw of the display denoted as C in equation (1), as provided in step 310. Next the method displays a static image with all pixels set to the target value corresponding to a point of the subgrid discussed with reference to FIG. 2, and the total power is again measured, as provided in step 312. This power is denoted as Z. Next the method subtracts Y from Z and divides by the total number of pixels to determine the per-pixel power draw for the subgrid point: ((Z−Y)/Number_of_pixels), as provided in step 314.

Figure 4:
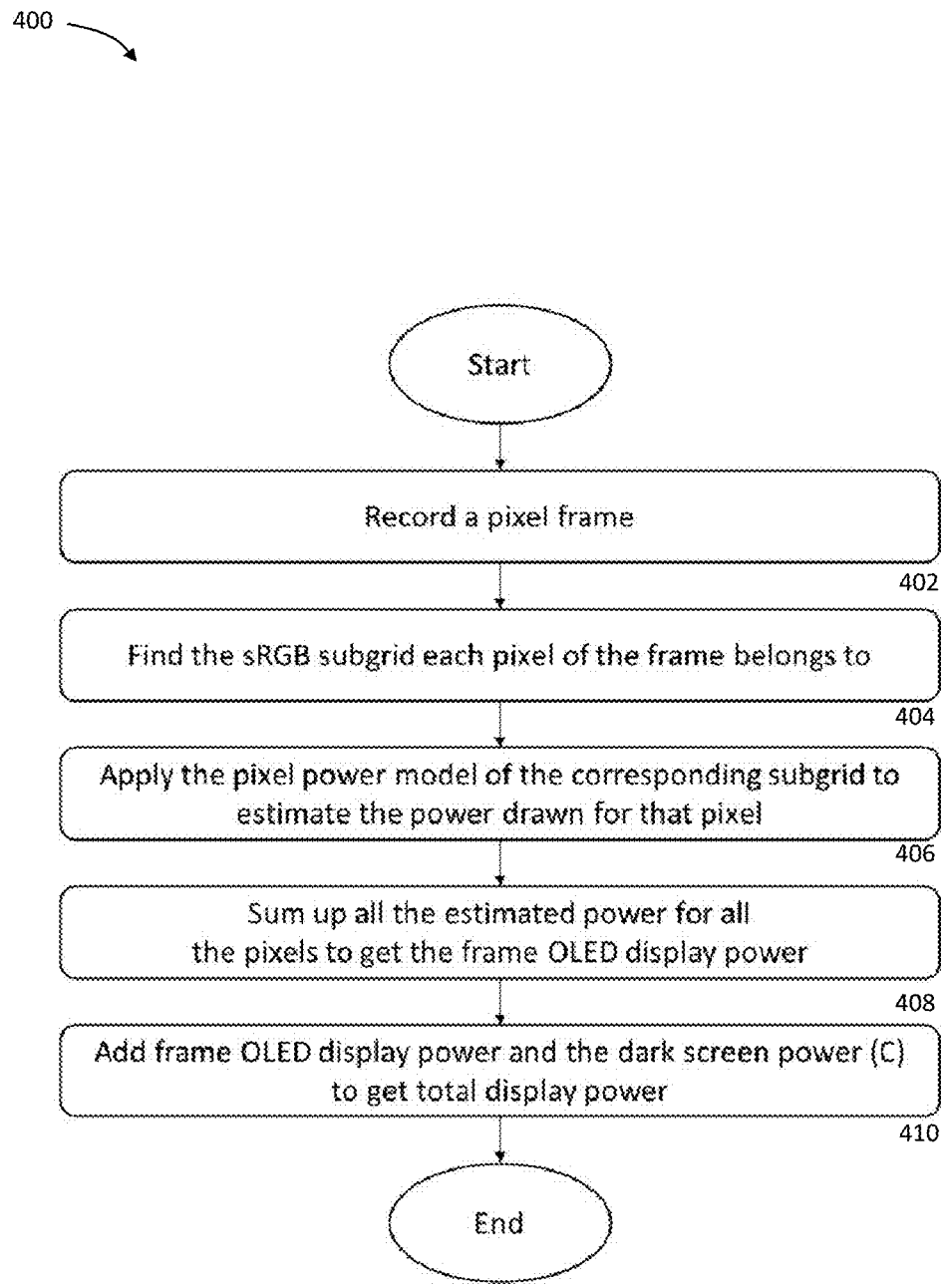
FIG. 4 is a flowchart depicting how to apply the model according to one embodiment of the present disclosure wherein the model is applied to each pixel without any sampling (sampling is defined as a regular spacing between pixels which requires multiplication of power by the sampling size in order to determine the overall power).

With the piecewise pixel power model for the display developed, the model can be applied to determine the total power usage of the display in displaying a frame of any given pixel content. Referring to FIG. 4, a flowchart is presented for a method 400 on how to apply the model according to one embodiment. In this embodiment, the model is applied to each pixel without any sampling (sampling is defined as a regular spacing between pixels which requires multiplication of power by the sampling size in order to determine the overall power). While not shown, the sampling approach is another embodiment according to the present disclosure for determining overall power usage.

Referring to FIG. 4, the model is applied by first recording a frame, as provided in step 402. Next the method determines the sRGB subgrid of the color space to which each pixel (or each sampled pixel according to the sampling embodiment) belongs, as provided in step 404. Next, the method applies the pixel power model of the corresponding subgrid to estimate the power drawn for that pixel, as provided in step 406. Next, the model sums up all the estimated power for all the pixels to obtain the frame OLED display power, as provided in step 408. Finally the constant C from equation (1) found in the steps of FIG. 3 is added to determine the overall power usage of the display, as provided in step 410.

Figure 5:
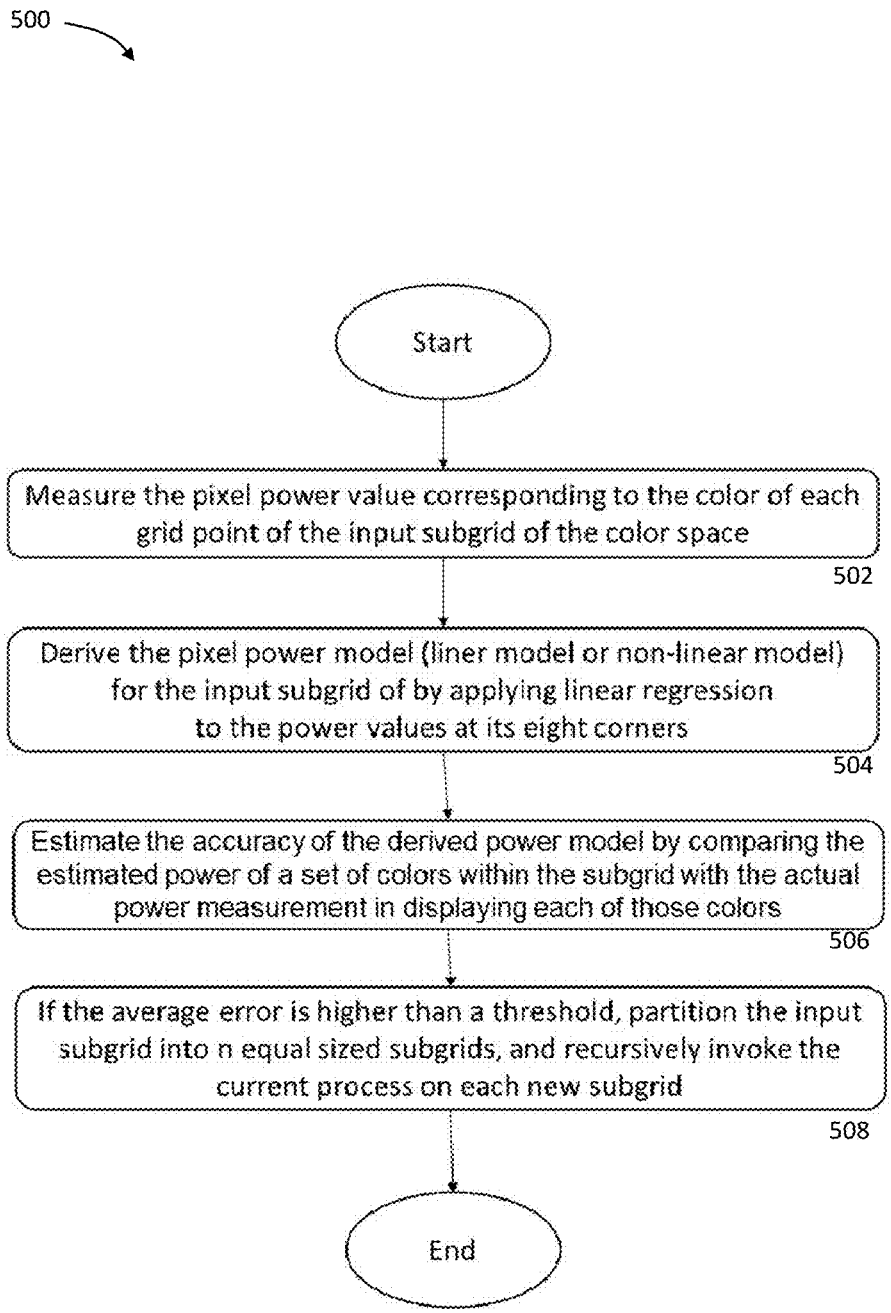
FIG. 5 is a flowchart depicting a method for adaptively partitioning the color space, according to the present disclosure.

As described above, in deriving the piecewise power model for the display, the partitioning of the color space can be based on equally-sized subdivisions, or based on an adaptive subgrid partitioning. The adaptive subgrid partitioning aims to find the largest subdivision for which the linear solution, e.g., the linear regression, is appropriate. Towards this end and with reference to FIG. 5, a method 500 for adaptively partitioning the color space is provided. The method 500 begins by measuring the pixel power value corresponding to the color of each grid point of the input subgrid of the color space, as provided in step 502. Next the method includes deriving the pixel power model (liner model or non-linear model) for the input subgrid by applying linear regression to the power values at its eight corners (see FIG. 2), as provided in step 504. Next the method includes estimating the accuracy of the derived power model by comparing the estimated power of a set of colors within the subgrid with the actual power measurement in displaying each of those colors, as provided in step 506. If the average error is higher than a threshold, partition the input subgrid into equal sized subgrids, and recursively invoke the current process on each new subgrid, as provided in step 508. In this approach, the recursive partitioning of the subgrid can be based on a power of 2, e.g., into 8 new subgrids, or a power of 3, e.g., into 27 new subgrids, and so on.

Figure 6:
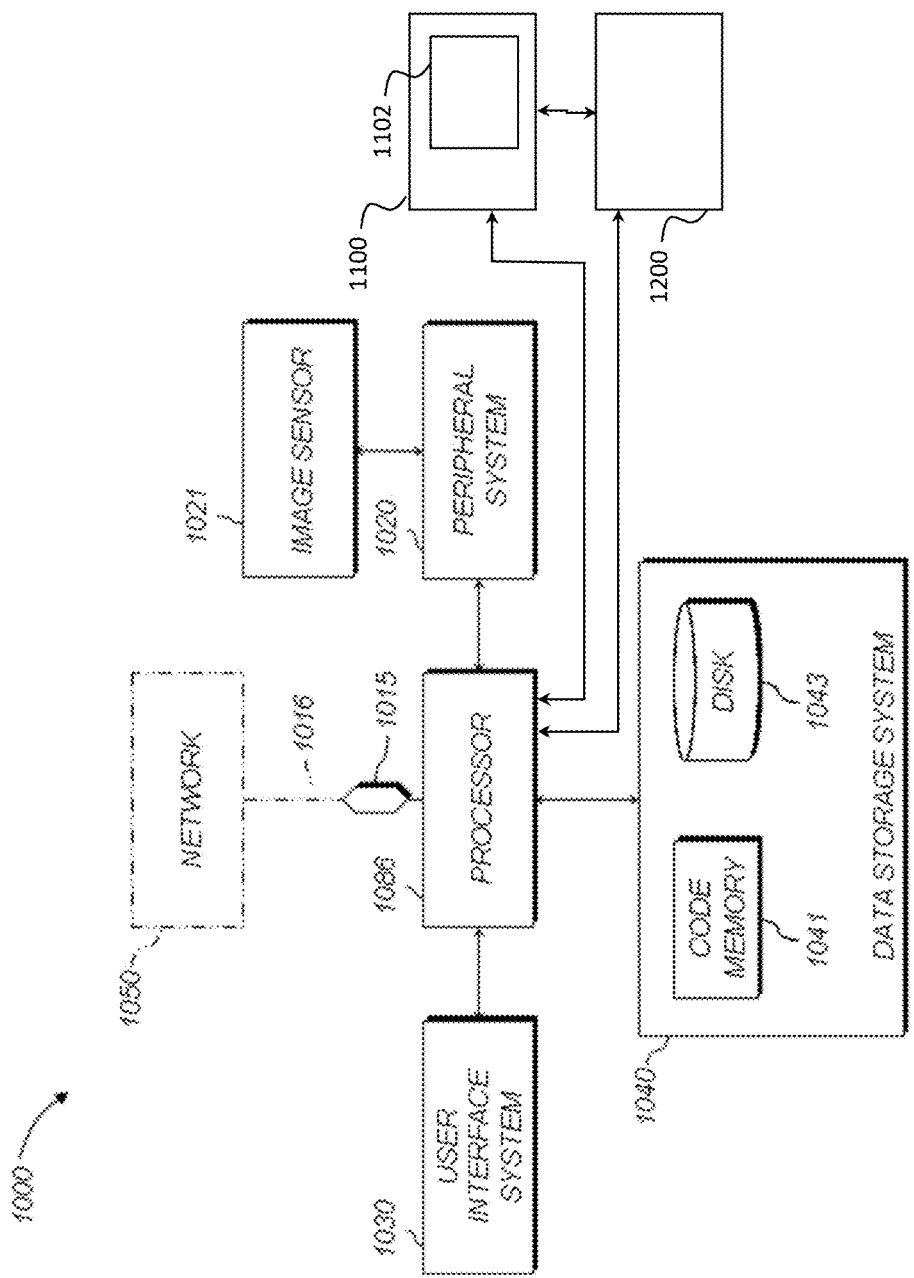
FIG. 6 is an example of a computer system that can interface with an external power monitoring device and a device with a display whose power consumption is of interest.

Referring to FIG. 6, an example of a computer system is provided that can interface with the above-discussed external power monitoring device. And the device whose display power consumption is of interest. Referring to FIG. 6, a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043.

Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processors). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

The processor 1086 is coupled to the external power monitoring device 1200 which is coupled to the device 1100 with the display 1102 whose power consumption is of interest. As discussed above with respect to FIGS. 2-5, the processor communicates with the device 1100 in order to drive the display 1102 and processes in the device 1100 while the external power monitoring device 1200 monitors power consumption of the device 1100, as discussed above. The methods discussed herein are performed by software residing in non-transitory memory and which is controlled by the processor 1086.

Those having ordinary skill in the art will recognize that numerous modifications can be made to the specific implementations described above. The implementations should not be limited to the particular limitations described. Other implementations may be possible.

The invention claimed is:

1. A method of determining a model for pixel power consumption for each pixel in a display of a device displaying each color in a color space, comprising:
   establishing a color space for the display;
   decomposing the color space into a plurality of subgrids;
   measuring the pixel power associated with a selected set of colors in each subgrid of the plurality of subgrids;
   establishing a pixel power model for each subgrid of the plurality of subgrids by applying a function to the power values at the selected set of colors in that subgrid; and
   deriving a piecewise pixel power model for the entire color space which includes pixel power models for the plurality of subgrids.

2. The method of claim 1, wherein the function is based on liner regression on linear terms of the power values.

3. The method of claim 1, wherein the function is based on liner regression on linear and non-linear terms of the power values.

4. The method of claim 1, wherein each subgrid of the plurality of subgrid is cubical, wherein the number of corners of each cube is 8.

5. The method of claim 1, wherein each subgrid of the plurality of subgrids is equally sized.

6. The method of claim 1, wherein size of each subgrid of the plurality of subgrids is adaptively determined based on estimating the power of a set of colors within each subgrid of the plurality of subgrids and comparing that estimate with the actual power measurement in displaying each color in the set of colors.

7. The method of claim 1, where the selected set of colors in each subgrid correspond to the eight corners of the subgrid.

8. The method of claim 1, wherein the pixel power measurement associated with each color in the selected set of colors of each subgrid of the plurality of subgrids, includes:
   coupling the device to an external power monitoring device;
   disabling the display;
   measuring total power draw by the device with the display disabled (X);
   enabling the display by providing a static image with all pixels of the image set to zero and measuring the total power draw by the device (Y);
   subtracting X from Y (Y−X) to obtain a constant baseline power draw associated with the display (C);
   enabling the display by providing a static image with all pixels of the image set to each said color and measuring the total power draw by the device (Z);
   subtracting Y from Z to obtain the total power draw (Z−Y) by the pixels for said color; and
   dividing the total power draw Z-Y by the number of pixels.

9. The method of claim 1, wherein the display is an organic light emitting diode-based.

10. The method of claim 1, wherein the device is a cellular phone.

11. A method of determining power consumption by a display of a device, comprising:
    receiving a piecewise pixel power model for a color space for the display, wherein the piecewise pixel power model is based on the pixel power models for a plurality of subgrids constituting the color space supported by the display;
    recording a frame comprising a plurality of pixels;
    determining to which subgrid of the plurality of subgrids each pixel of the plurality of pixels belong;
    applying the piecewise pixel power model to each pixel to estimate the power draw associated with the associated pixel;
    summing up all the estimated powers for the plurality of pixels; and
    adding a constant baseline power draw value associated with running the display to the estimated power for all the pixels to thereby generate an overall power draw associated with the display, wherein the constant baseline power is a difference between total power draw of the device displaying a static image where all pixels are set to zero, and total power of the device when the display is deactivated.

12. The method of claim 11, wherein the display is an organic light emitting diode-based.

13. The method of claim 11, wherein the device is a cellular phone.

14. The method of claim 11, wherein spacing between each pixel of the plurality of pixels is one.

15. The method of claim 14, wherein the estimated power for the plurality of pixels is multiplied by $K^2$ before adding the constant baseline power draw associated with running the display.

16. The method of claim 11, wherein spacing between each pixel of the plurality of pixels is K.

* * * * *